March 5, 1935.  P. E. KLOPSTEG  1,993,063
GAUGE
Filed March 28, 1930
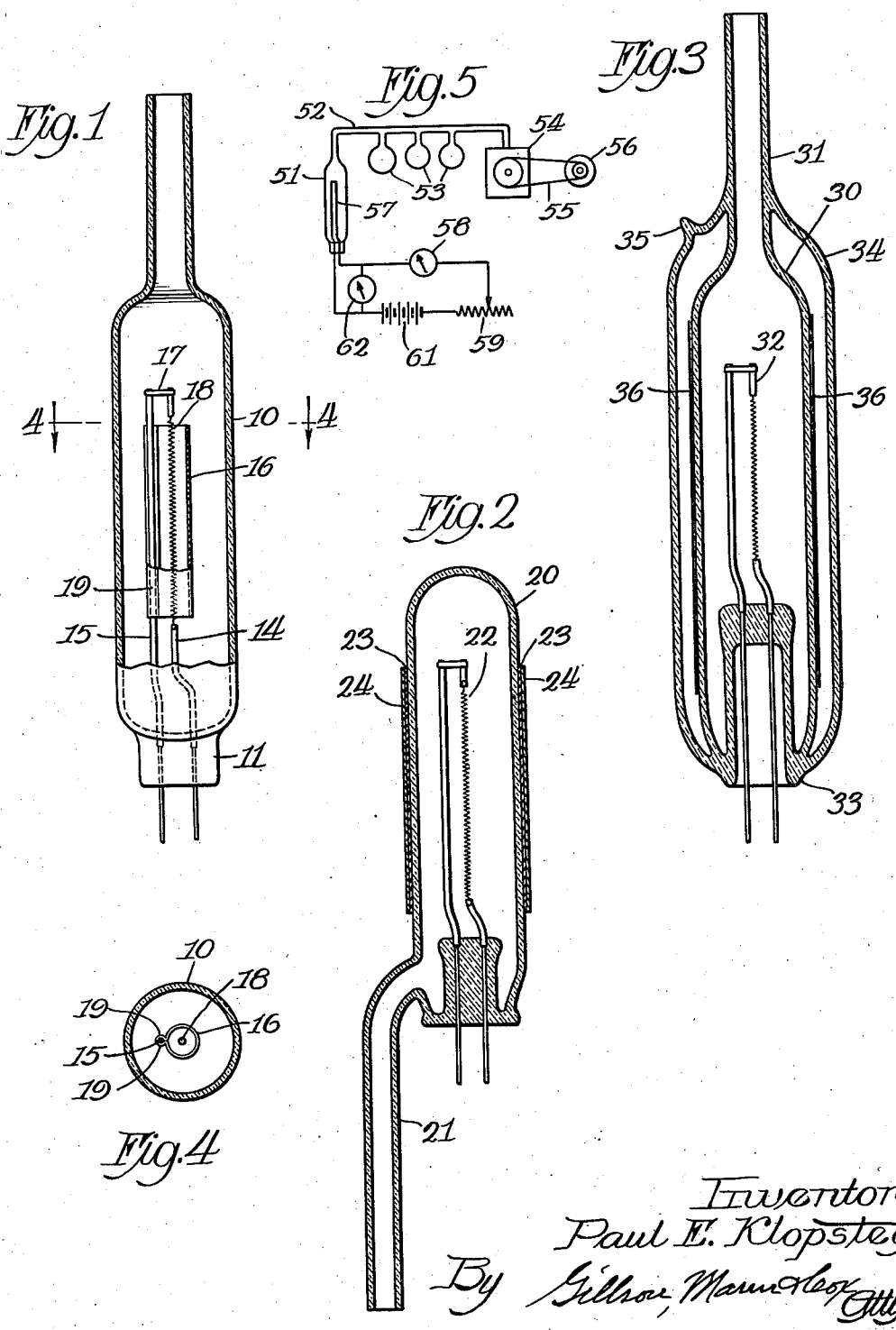
Inventor:
Paul E. Klopsteg
By Gillson, Martin & Cook
Attys.

Patented Mar. 5, 1935

1,993,063

UNITED STATES PATENT OFFICE 1,993,063

GAUGE

Paul E. Klopsteg, Chicago, Ill.

Application March 28, 1930, Serial No. 439,610

12 Claims. (Cl. 73—31)

This invention relates to fluid pressure measuring instruments, particularly to gauges depending upon changes in heat loss, which is a concomitant condition with change in pressure.

The principal object of the invention is to increase the accuracy and constancy of the instrument.

Other and further objects and advantages will become apparent as the disclosure proceeds and the description is read in conjunction with the accompanying drawing, in which Fig. 1 represents my improved device with the reflecting element mounted inside the envelope;

Fig. 2 indicates a form of device wherein I utilize the envelope wall as a support for the reflecting element;

Fig. 3 shows a further variation of the form of Fig. 2 wherein the reflecting surface is protected by being sealed off in a protecting vacuum space;

Fig. 4 is a section through Fig. 1; and

Fig. 5 illustrates one only of the various electrical circuits necessary to indicate the changes taking place in my improved device.

Prior instruments of the kind or class may be illustrated by what has become known as the Pirani gauge which in its simplest form is a heated filament in an enclosed space wherein the pressure changes.

As is well known, the Pirani gauge depends for its operation upon the fact that if a body be heated with a constant energy input, the body will grow hotter as the atmosphere surrounding it is attenuated. Because the losses due to convection become less and less in amount, the energy loss to the surrounding gas becomes, therefore, less and less as the gas pressure falls. The heated element, therefore, increases in resistance. The common form of such a gauge utilizes a filament much like that in an electric lamp and measures the change in resistance occurring in the filament with changes in pressure in the atmosphere of the enclosing bulb. With such a construction, it is obvious that the major losses in the system will be radiant energy losses, and that there will also be substantial losses through the lead wires and the supports necessary to hold up the filament in the vacuous space.

The amount of energy lost by conduction to the gas in the space is, at high pressures, considerable and decreases very rapidly as the evacuation continues. The radiant losses form such a large proportion of the total loss, however, that changes in the conductive loss to the ambient gas which cause the increase of resistance, due to the fact that the radiating body is increasing in temperature, form a very small proportion of the total loss. As is well known, minor changes in the physical condition of a radiating body violently upset the degree of radiation from the body, and, since the gauge is an instrument to measure various conditions at various times, it should be constant and dependable yet the inconstancy of the loss by radiation causes gross errors with a frequency which is particularly annoying. Pirani gauges do not maintain calibration well. The most noticeable error is "drift"—that is, points on ordinates or abscissa move without changing the shape of the curve. It seems probable that very minor changes in the surface of the radiating filament cause such changes in radiant loss that the return to zero of such a gauge is erratic.

I have discovered that it is possible to make the gauge at once more sensitive and more constant in calibration if precautions are taken to make the radiation losses a lesser and the conductive heat losses a larger proportion of the whole heat loss, and this I accomplish in the following manner.

In Fig. 1, the part 10 represents a glass container or envelope, provided as is common in lamp or vacuum tube constructions with an external press 11. Two metal welds, such as are commonly used in vacuum tube practice, pass through the press. The portions 14 and 15 projecting into the vacuum chamber are composed of refractory metal, while those passing through the glass and forming the lead-in wires may be of "copper-clad" wire, tungsten, etc. as the nature of the glass demands. Mounted upon the upstanding metal rod 15 is a cylindrical mirror 16 made from a sheet of refractory metal which previously has been polished on its inner surface and then carefully treated to remove the polishing materials and adsorbed gases, etc.

As shown in Fig. 4, extensions 19, preferably integral with the mirror portion 16 are bent to surround the support rod 15, and welded or attached thereto.

The upper portion of the rod 15 carries a small spring bracket 17 of some refractory metal, such as molybdenum to which the radiating body 18 is affixed by welding or by suitable means. The radiating body 18 is attached at its lower end to the refractory metal lead 14. The radiating element 18 which is accurately placed along the axis of the mirror, may be any metallic filament or a carbon rod. Because a blackened surface undergoes much smaller changes in emissivity than does a bright surface when subjected to various kinds of gases and vapors that must of necessity get into the gauge, I prefer that the radiating body should have black body radiation characteristics and treat the radiating metal to produce such a surface. It is also an advantage in the reception of energy reflected by the mirror that the receiving body should be black since it is then free from selective absorption.

It is also desirable, in order to make the gauge as sensitive as possible, that the electrical resistance of the radiating body should be of a reasonably high order. For that reason, the drawing indicates the radiating element as a helical filament. This is good practice but not necessary as is well understood. The metal of the helix is oxidized or may be blackened by carbon deposits before being put in place.

I find tungsten a convenient radiating element, but a nickel strip treated to give a nickellic-oxide surface is particularly suitable for the radiating body since the change in resistance of nickel with changes in temperature is considerable. Platinum is also a suitable radiating element. In fact, for particular uses and sensibilities of the instrument, any element which is an electrical conductor is usable.

Referring now to Fig. 2, instead of placing the mirror in the vacuous space, I may place the mirror outside of the vacuum chamber. In Fig. 2, the glass envelope 20 encloses the vacuum space which is connected to the exhaust system through the tube 21. The walls of the envelope 20 form a substantially accurate cylinder through a portion of their length. The radiating body 22 as mounted in the manner described in relation to Fig. 1 is accurately centered along the axis of the cylinder and occupies a zone about the axis. The outer walls of the glass cylinder are covered with silver or other good reflecting agent, indicated by 23—23. The silver coating is in turn protected by varnish or protecting lacquer 24, 24.

In Fig. 3, the radiating element 32 occupies a zone about the axis of the cylinder formed by the wall of the enclosing bulb 30. The tube connecting the vacuum chamber with the exhausting system is shown at 31. Sealed to the tube 31 and ring sealed to the flare and inner envelope at 33 is an exterior envelope 34 which is provided with a seal-off tubulation at 35. The space between the envelopes is now exhausted after the insertion of a small piece of evaporable metal and the metal flashed in the vacuous space. The mirror thus formed is indicated diagrammatically by the heavy lines 36—36, though it is understood that the vaporized metal coats the entire surface of the enclosed space. Instead of flashing a metal mirror, I may deposit silver therein and protect the silver by evacuation and subsequent seal-off, or I may decompose nickel carbonyl, or produce a mirror by any other known means.

Although the common use of the gauge is to measure the degree of vacuum, it is understood that the device may be operated in high as well as low pressures. The term "vacuous chamber" is, therefore, used to define the space wherein the pressure changes occur. I do not intend the term to limit or describe the pressure which may exist therein.

In Fig. 5, the numeral 51 indicates an improved gauge connected by conduit 52 to the chambers 53, 53 in which the pressure is to be measured. The conduit proceeds to a pump 54 or other means of changing the pressure within the system. The pump is driven through the belt 55 by the motor 56. The heat radiating element is indicated at 57 and is shown connected into a circuit comprising a sensitive ammeter 58, a regulating resistance 59, a battery or other source of energy 61 and a voltmeter 62 bridged across the circuit.

The operation of the device is as follows: Current is sent through the radiating element. Three systems of loss are then set up,—loss through the necessary mechanical supports and the electrical conductors; conductive loss into the gas atmosphere; and radiation loss. Since the heat radiating element occupies space about the axis of the mirror, heat radiated from it is reflected by the mirror back onto the element. The over-all radiant loss, therefore, is not so high in degree as where there is no reflection. Consequently, the conductive loss to the gas becomes a larger fraction of the whole loss. Since this is the changing quantity that we wish to measure, it is actually a larger absolute quantity than heretofore, and the gauge gains in accuracy thereby. Since the radiant loss is a smaller absolute quantity than heretofore, the variability of this radiant loss does not produce such a large effect upon the instrument, and since a black radiant body suffers smaller changes in emissivity than a bright surface, the variability of the radiant loss is still further reduced. Consequently, since this was the variable which caused the loss of calibration, my improved device maintains its calibration far better than previous types.

With reference to Fig. 5, pressure indications are obtained as follows: If the voltage within the circuit is maintained constant, and the pressure within the gauge 51 falls, the resistance of the radiating element 57 rises producing a change in current which is indicated by the ammeter 58. It is to be understood that this simple circuit is shown for the purposes of illustration only, and that many other circuits particularly those involving Wheatstone bridge elements are highly useful and may increase the accuracy of the readings obtainable by the instrument.

What I claim, therefore, is:

1. In a pressure measuring instrument, an envelope adapted to be placed in communication with a pressure source, a heat radiating body mounted within said envelope, a reflector surrounding said heat radiating body and focused thereon for reflecting the radiant energy from said heat radiating element back onto the entire body of the heat radiating element.

2. In a pressure measuring instrument, an envelope adapted to be placed in communication with a pressure source, a heat radiating element mounted within said envelope capable of non-selective absorption of radiant heat, and a reflector surrounding said element and focused thereon for returning radiant heat onto said radiating element.

3. In a device of the class described, an envelope having an opening therein adapted to be placed in communication with a pressure source, a heat radiating body within the space, and means for returning to the body a portion of the heat radiations emanating from the body whereby the ratio of conductive heat loss to radiant heat loss is maintained at a relatively high value.

4. In a pressure gauge of the class described, a filamentary body exposed to an ambient gas and adapted to emit heat directly thereto, means for changing the density of the gas and a hollow cylindrical reflector, said filamentary body occupying a zone substantially along the axis of said reflector.

5. In a pressure gauge of the class described an envelope adapted to be placed in communication with a pressure source, a heat radiating element mounted within said envelope comprising a black body radiator and a reflector for returning radiant energy thereto whereby non-selective absorption of the reflected radiant energy is secured.

6. A gauge for determining the pressure of fluids comprising an envelope, means for connecting the space enclosed in said envelope with another space in which the pressure is to be determined, electric lead wires extending through the envelope, supporting means attached to said envelope, a heat radiating element attached to the supporting means and adapted to be heated by the passage of an electric current therethrough, said radiating element being exposed to the fluid within the envelope, and a reflector receiving radiations from said radiating element and returning a portion of such radiations to said element.

7. A gauge for determining the pressure of fluids comprising an envelope, a filamentary body supported therein and adapted to be heated by the passage of an electric current therethrough, said body being exposed to the fluid in the envelope, lead wires extending through the envelope for the purpose of supplying current to said filamentary body, a reflecting element maintained in parallel relation to said filamentary body to receive energy from and reflect energy to the said filamentary body, and means connecting the space within the envelope to the space wherein the pressure is to be determined.

8. Apparatus for measuring the fluid pressure in enclosed systems, comprising in combination, an envelope, a radiating element supported therein, a reflecting element arranged to return a portion of the energy received from the radiating element back onto the radiating element, a source of electrical energy, means for connecting the source to the radiating element, electrical measuring instruments connected in circuit with the radiating element arranged to determine a change in condition in said element, a chamber in which the pressure is to be determined in free communication with the space enclosed by said envelope, and means for changing the pressure within both said space and chamber.

9. In a pressure gauge, an envelope having an opening therein adapted to be placed in communication with a pressure source, electric lead wires passing therethrough, supports within the envelope connected to the lead wires, a helically coiled filament stretched between the supports and a sheet metal reflector surrounding the filament and focused thereon.

10. In a pressure measuring device, a cylindrical envelope in communication with a space, the pressure in which is to be tested, electric lead wires passing through the envelope, supporting elements connected to the wires within the envelope, a helically coiled filament stretched between the supports and occupying the axis of the cylinder and a reflecting surface formed upon the exterior of the envelope and directed inwardly whereby radiant energy liberated by the filament is reflected back thereon.

11. A pressure measuring device comprising an inner envelope, electric lead wires passing therethrough, supporting elements attached to the envelope and to the leads, a filament extending between the supporting elements, an outer envelope sealed to the walls of and enclosing the envelope first named, a reflecting surface formed upon the wall of the inner envelope, and means connecting the space within the inner envelope to the space wherein the pressure is to be determined.

12. In a pressure gauge, an envelope having an opening therein adapted to be placed in communication with a pressure source, electric lead wires passing therethrough, supporting elements within the envelope connected to the leads, a filament extending between the supports and a reflector maintained upon one of the supporting elements and focused upon the filament for reflecting heat back onto the filament.

PAUL E. KLOPSTEG.